(12) United States Patent
Mercier

(10) Patent No.: US 11,273,662 B2
(45) Date of Patent: Mar. 15, 2022

(54) SECURE MULTILAYER STRUCTURE WITH SECURITY ELEMENT LOCATED ON A WINDOW

(71) Applicant: ASSA ABLOY AB, Stockholm (SE)

(72) Inventor: Frantz Mercier, Hollister, CA (US)

(73) Assignee: ASSA ABLOY AB, Stockholm (SE)

( * ) Notice: Subject to any disclaimer, the term of this patent is extended or adjusted under 35 U.S.C. 154(b) by 408 days.

(21) Appl. No.: 16/375,186

(22) Filed: Apr. 4, 2019

(65) Prior Publication Data

US 2020/0316980 A1 Oct. 8, 2020

(51) Int. Cl.
| | | |
|---|---|---|
| *B42D 25/351* | (2014.01) | |
| *B42D 25/387* | (2014.01) | |
| *B42D 25/45* | (2014.01) | |
| *B32B 27/06* | (2006.01) | |
| *B32B 27/36* | (2006.01) | |
| *B32B 27/40* | (2006.01) | |
| *B42D 25/23* | (2014.01) | |
| *B42D 25/435* | (2014.01) | |

(52) U.S. Cl.
CPC ............ *B42D 25/351* (2014.10); *B32B 27/06* (2013.01); *B32B 27/365* (2013.01); *B32B 27/40* (2013.01); *B42D 25/387* (2014.10); *B42D 25/45* (2014.10); *B32B 2307/422* (2013.01); *B42D 25/23* (2014.10); *B42D 25/435* (2014.10)

(58) Field of Classification Search
CPC . Y10T 428/23; B32B 2307/422; B42D 25/23; B42D 25/36; B42D 25/351; B42D 25/378
See application file for complete search history.

(56) References Cited

U.S. PATENT DOCUMENTS

| | | | |
|---|---|---|---|
| 9,899,698 B2 | 2/2018 | Ku et al. | |
| 2014/0151996 A1* | 6/2014 | Camus | D21H 21/40 |
| | | | 283/67 |

FOREIGN PATENT DOCUMENTS

| | | |
|---|---|---|
| EP | 1935663 | 6/2008 |
| WO | 2014081280 | 5/2014 |
| WO | 2017089901 | 6/2017 |

OTHER PUBLICATIONS

Webster's II New Riverside University Dictionary, definition of "adjacent", 1984, p. 78. (Year: 1984).*
"European Application Serial No. 20167703.6, Response filed Oct. 27, 2021 to Communication Pursuant to Article 94(3) EPC dated Aug. 12, 2021", 19 pgs.
"European Application Serial No. 20167703.6, Response filed Mar. 18, 2021 to Extended European Search Report dated Aug. 24, 2020", 6 pgs.

(Continued)

*Primary Examiner* — Alexander S Thomas
(74) *Attorney, Agent, or Firm* — Schwegman Lundberg & Woessner, P.A.

(57) ABSTRACT

A secure multilayer structure, in particular for a secure document, including a base layer, at least one masking layer including a window opened in the masking layer, the window having an edge, a security element including a photoluminescent agent positioned between the base layer and the masking layer, adjacent to the window edge, such that the presence of the agent can be checked by illuminating the edge of the window and viewing the re-radiated luminescent light emerging from the masking layer through the window edge.

17 Claims, 2 Drawing Sheets

(56) References Cited

OTHER PUBLICATIONS

"European Application Serial No. 20167703.6, Extended European Search Report dated Aug. 24, 2020", 6 pgs.
"European Application Serial No. 20167703.6, Communication Pursuant to Article 94(3) EPC dated Aug. 12, 2021", 4 pgs.

* cited by examiner

SECURE MULTILAYER STRUCTURE WITH SECURITY ELEMENT LOCATED ON A WINDOW

FIELD OF THE INVENTION

The present disclosure is generally directed toward security features and more particularly toward security features in multilayer structures.

BACKGROUND OF THE INVENTION

Identification documents are often used to prove one's identity. However, the possibility of counterfeit identity documents exists and, as such, the need to combat such counterfeiting arises, especially when documents are relied upon for security or access control purposes.

Well-known counterfeit countermeasures exist such as holograms and/or images that can be revealed by being exposed to ultraviolet lights. However, counterfeiting operations constantly evolve to try and keep up with the countermeasures. Accordingly, the need exists to continue developing counterfeiting countermeasures (e.g., security features) for identification documents and other objects that carry an inherent level of trust.

Identification documents in the form of identification cards (e.g., passports, secure cards, etc.) are used in a wide array of applications including access control, identification, and financial transfer applications. Secure documents typically consist of a multilayer structure including various layers which carry information (e.g., alphanumeric information, logos, and/or a picture of the card holder) and security features.

One counterfeit countermeasure approach involves integrating one or more security features within the edge of the card or multilayer structure.

One example of an edge security feature is described in U.S. Pat. No. 9,899,698. It describes a multilayer structure including a security element comprising a photoluminescent material multilayer structured between a core layer of the multilayer structure and a second layer of the multilayer structure such that the presence of the security element can be checked by illuminating the edge connecting the core and second layers of the multilayer structure and viewing the re-radiated luminescent light emerging from the core layer through the at least one edge. Although effective in detecting tampering or counterfeiting, the '698 security feature is exclusively contained within the periphery (edge) of the identification document, thus limiting manufacturing possibilities and making it difficult to combine with other security features.

SUMMARY OF THE INVENTION

It is therefore one aspect of the present disclosure to provide an even more secure multilayer structure to be used in identification documents (e.g., identification cards) which also allows more flexibility in its manufacturing.

A first aspect of the present disclosure concerns a secure multilayer structure, in particular for a secure document, comprising
  a base layer,
  at least one masking layer comprising a window opened in the masking layer, said window comprising an edge, and
  a security element including a photoluminescent agent positioned between the base layer and the masking layer, adjacent to the window edge, such that the presence of the agent can be checked by illuminating the edge of the window and viewing the re-radiated luminescent light emerging from the masking layer through the window edge.

The term "re-radiated" and "re-radiating" may be used interchangeably to refer to any amount of light produced by a photoluminescent material in response to that material being illuminated with a first type of light. The photoluminescent material may be configured to "re-radiate" a second type of light in response to illumination with the first type of light where the second type of light has at least one different property as compared with the first type of light. Thus, "re-radiated" light may correspond to light that has reflected off the photoluminescent material and had one or more of its light properties changed as a result of the interaction with the photoluminescent material.

Owing to the fact that the security element is positioned between the base layer and the masking layer, adjacent to the window edge, the masking layer will mask the security element in such a way that it will not be made visible when facing the secure multilayer structure. As the masking layer may be chosen to be substantially opaque to the re-radiated luminescent light, it can force the light to emerge through the covering layer. Indeed, as the security element is placed adjacent to the window edge, it will be made visible when the edge of the window is illuminated. Thus, in order to authenticate or verify the authenticity of a multilayer structure according to the present disclosure, illumination light is shone towards the security element via the window edge of the multilayer structure. As an example, if the window edge appears to have a rainbow hue or alternating colors that correspond to the alternating colors of the security element, then the determination can be made that the multilayer structure is authentic. If, on the other hand, the observed light has not changed relative to the illumination light, then the multilayer structure may be determined to be a counterfeit, forgery, or not authentic.

Such a configuration offers more manufacturing possibilities as the window can be placed anywhere on the sheet that the masking layer is made of. In addition, the security element can be combined with other security features such as laser-engraving placed on the base layer, facing the window and/or an image printed on the covering and/or masking layers, making counterfeiting the secure multilayer structure much more difficult.

Finally, as the security element is provided between a masking layer and a base layer, the security element can be established during batch production of multilayer structures instead of after a multilayer structure has been cut into card-shaped structures (e.g., die cut). This means that a multilayer structure can be manufactured with a security element at a relatively low cost.

Preferably, the photoluminescent agent comprises an ultraviolet fluorescent material.

Preferably, the masking layer is substantially opaque to the re-radiated luminescent light.

Preferably, the multilayer structure also comprises a covering layer transmitting at least one of ultraviolet light, visible light, and infrared light.

According to a particular embodiment, the covering layer is also opaque to visible light.

The secure multilayer structure may also comprise a printed layer multilayer structured between the base layer and the masking layer, said printed layer comprising a printed region. Such a printed region provides for another level of security as it must be reproduced.

Preferably, the covering layer comprises a transparent or semi-transparent material, in particular at least one of transparent polycarbonate (PC) and thermoplastic polyurethane (PU).

According to a preferred embodiment, the base layer comprises a laser-engraved and/or printed region facing the window. Such a laser-engraved region can comprise data relative to the person owning the security document.

Preferably, the base layer and/or the covering layer and/or the masking layer comprises a printed region.

Advantageously, the printed regions of the covering layer and/or the masking layer/and or the base layer and/or the printed layer each comprise parts of a single image, such that, when the covering layer and/or the masking layer and/or the base layer and/or the printed layer are superimposed, said image is formed, and such that when the secure multilayer structure is viewed from above, the image can be viewed in a continuous manner.

According to a second embodiment of the present disclosure, the secure multilayer structure further comprises
 a second masking layer,
 a second covering layer,
 said second masking comprising a second window opened in the second masking layer, said second window comprising an edge, and
 a second security element including a photoluminescent agent positioned between the base layer and the masking layer, adjacent to the second window edge, such that the presence of the agent can be checked by illuminating the edge of the second window and viewing the re-radiated luminescent light emerging from the covering layer through the second window edge.

Preferably, the surface delimited by the edge of the second window is contained within the surface delimited by the edge of the first window.

According to a preferred embodiment, the first masking layer is laminated between the covering layer and the second covering layer, the second masking layer being laminated between the second masking layer and the printed layer.

It is another aspect of the present disclosure to incorporate the multilayer structure in a security document, such as an identification card. Thus, counterfeiting of security document is made significantly more difficult.

It is yet another aspect of the present disclosure to provide a method for manufacturing a secure multilayer structure.

BRIEF DESCRIPTION OF THE DRAWINGS

The present disclosure will be further understood from the following detailed description. A particular non-limiting embodiment of the description will now be described using the attached figures in which.

DETAILED DESCRIPTION OF THE INVENTION

With reference now to FIGS. 1 to 4, security features for structures and methods of producing structures will be described. While the description and figures are generally directed toward security features in structures, it should be appreciated that embodiments of the present disclosure are not so limited. Moreover, it should be noted that the concepts disclosed herein can be utilized in other mulitlayered structures and do not necessarily have to be applied to identification documents.

Figure 1:
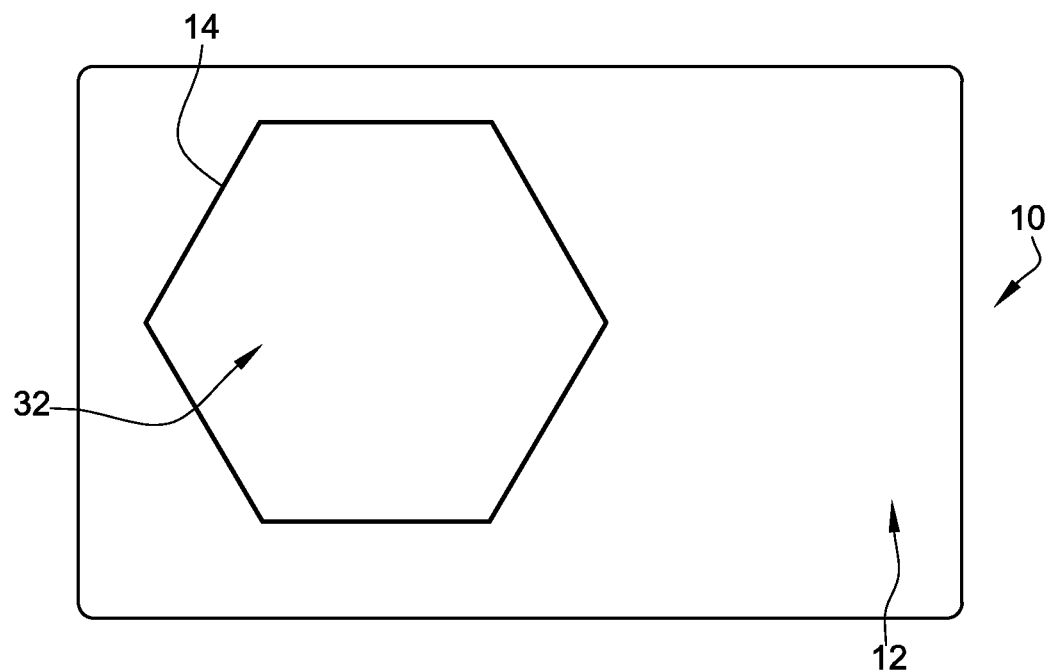
FIG. 1 is a top view of an identification document in accordance with embodiments of the present disclosure according to a first embodiment.

With reference initially to FIG. 1, a multilayer structure 10, such as an identification document, is shown. The multilayer structure 10 is depicted as being in card form, the shape of the card being rectangular, but other forms or shapes could be considered. The multilayer structure 10 is shown to include a card body 12 with a first security element 14 and a second security element 16 incorporated therein.

Figure 2:
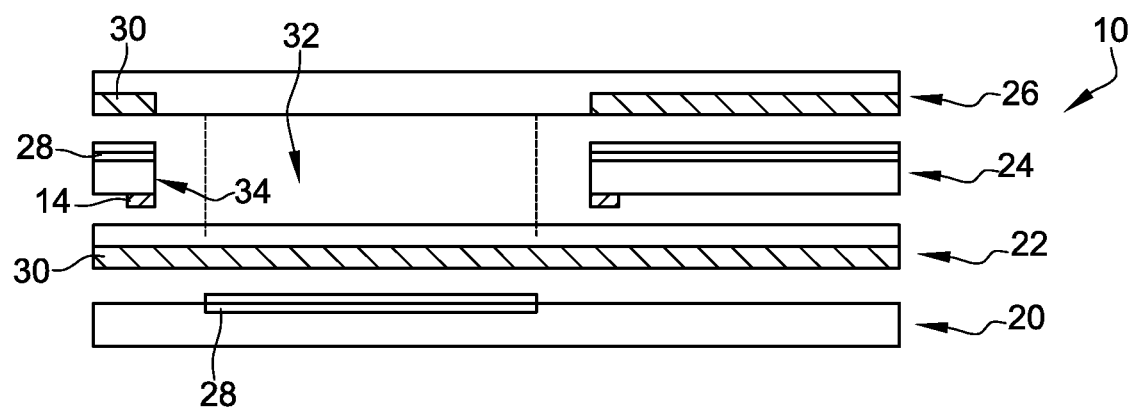
FIG. 2 is a cross-sectional view of the identification document of FIG. 1.

FIG. 2 depicts further details of the construction of a particular embodiment of a multilayer structure 10. Here it should be noted that the relative thicknesses of the different layers of the multilayer structure 10 as depicted in the Figures do not necessarily correspond to the actual thicknesses of these layers and are only so represented for comprehension purposes. In particular, the layers do not necessarily need to exhibit the same thickness. Furthermore, the thickness of each layer and the relative thicknesses of each layer should not be construed as being limited to any particular dimension.

The secure multilayer structure shown on FIG. 2 comprises a base layer 20, a printed layer 22, a masking layer 24, and a covering layer 26, preferably laminated in this order. Advantageously, all layers are made out of sheets of the same dimension so as to be easily laminated together.

The base layer 20 is preferably made out of an opaque sheet of plastic or polymer, preferably laser engravable for personalization. The base layer comprises a laser-engraved region 28, which preferably contains secure data, typically data relative to the person to which the secure document belongs to, such as their name, address, etc. More specific examples of materials that may be used to construct the base layer 20 include, without limitation, Polyvinyl Chloride (PVC), Polyethylene Terephthalate (PET), or the like. In another embodiment (not represented in the Figures), the base layer 20 may also comprise a printed region depicting an image, which can be decorative in nature but also constitutes a security feature in itself as it has to be reproduced.

The printed layer 22 comprises a printed region 30 that depicts an image, which can be decorative in nature but also constitutes a security feature in itself as it has to be reproduced. In order to make the laser-engraved region 28 visible, the material of the printed layer is preferably made out of a plastic, polymer, or composite material that is transparent or translucent in nature. Here, the printed region 30 occupies the whole surface of the sheet the printed layer 22 is made of, but only a part of said sheet can be printed. For example, the surface of the printed region can be made to correspond to the surface delimited by the edge 34 of the window 32 made in the masking layer 24 as defined below. In another embodiment (not represented in the Figures), the printed layer 22 may be removed altogether. In that case, the base layer 20 comprises the printed region 30.

Unlike the printed layer, the masking layer 24 is preferably made out of an opaque sheet of plastic or polymer, preferably laser engravable for personalization. It comprises an open window 32 that is see-through and preferably punched out of the masking layer 24. The window 32 opened in the masking layer 24 can be opened in any region of the masking layer 24, and can be of various sizes and shapes.

Window 32 possesses a closed edge 34. Here the window 32 has the shape of a hexagon, as can be seen in FIG. 1, and occupies almost half of the total surface of the initial sheet the masking layer 24 is made of. The purpose of window 32, among others, is to make the laser-engraved region 28 of the base layer 20 visible. The masking layer 28 may also comprise, on one of its sides, a laser-engraved region 28. Preferably, the laser-engraved region 28 faces the covering layer 26. In other embodiments, the laser-engraved region 28 may also be replaced by a printed region, or a printed region may be added besides the laser-engraved region 28.

The covering layer 26 transmits at least one of ultraviolet light, visible light, and infrared light. Preferably, the covering layer is opaque to visible light and transmits at least one of ultraviolet light or infrared light. In addition, in order to make the laser-engraved region 28 visible, it is preferably made out of a plastic, polymer, or composite material that is transparent or translucent in nature. As one non-limiting example, covering layer 26 may correspond to or comprise a clear sheet of Polycarbonate (PC) or Thermoplastic Polyurethane (TPU). Of course, any other material that is useful in lamination operations and also exhibits transparent or translucent properties may be utilized. It should be noted that the covering layer 26 and the printed layer 22 are preferably constructed of the same material, although they do not have to be constructed of the same material.

The covering layer 26 may also comprise a printed region 30 on one of its sides, preferably the side that it opposite its free surface. The printed region 30 of the covering layer occupies a portion of the surface of the covering layer 26 that does not face the window 32. Preferably, the printed region covers the whole surface of the covering layer except the region of the covering layer facing the window 32.

The printed regions 30 of the covering layer 26 and the printed layer 22 each comprise parts of a single image, such that, when the covering layer 26 and the printed layer 22 are superimposed, said image is formed, and such that when the secure multilayer structure 10 is viewed from above, the image can be viewed in a continuous manner.

The security element 14 is positioned between the base layer 20 and the masking layer 24, adjacent to the window edge 34. More particularly, in this first embodiment, it is laminated between the printed layer 22 and the masking layer 24. The security element 14 includes a photoluminescent agent such that the presence of the agent can be checked by illuminating the edge 34 of the window and viewing the re-radiated luminescent light emerging from the covering layer 26 through the window edge 34 since the covering layer 26 is at least one of transparent or translucent. Preferably, the security element 14 may correspond to a photoluminescent ink or the like. Specifically, the security element 14 may be configured to be printed on one side of the masking layer 24, the one opposing the cover layer 26.

The security element 14 is therefore positioned such that masking layer 28 will mask, the security element 14 in such a way that it will not be made visible when facing the secure multilayer structure 10. As the masking layer 24 is substantially opaque to the re-radiated luminescent light, it will force the light to emerge through the covering layer 26. Indeed, as the security element 14 is placed adjacent to the window edge 34, it will be made visible when the edge 34 of the window is illuminated.

As can be appreciated, the security element 14 is provided between the surface of the masking layer 24 and a printed layer 22, which means that the security element 14 can be established during batch production of the multilayer structure structures 10 instead of after a multilayer structure 10 has been cut into card-shaped structures (e.g., die cut). This means that a multilayer structure 10 can be manufactured with a security element 14 at a relatively low cost.

Although only four layers are depicted in the multilayer structure 100, it should be appreciated that a greater or lesser number of layers of material may be used without departing from the scope of the present disclosure.

Figure 3:
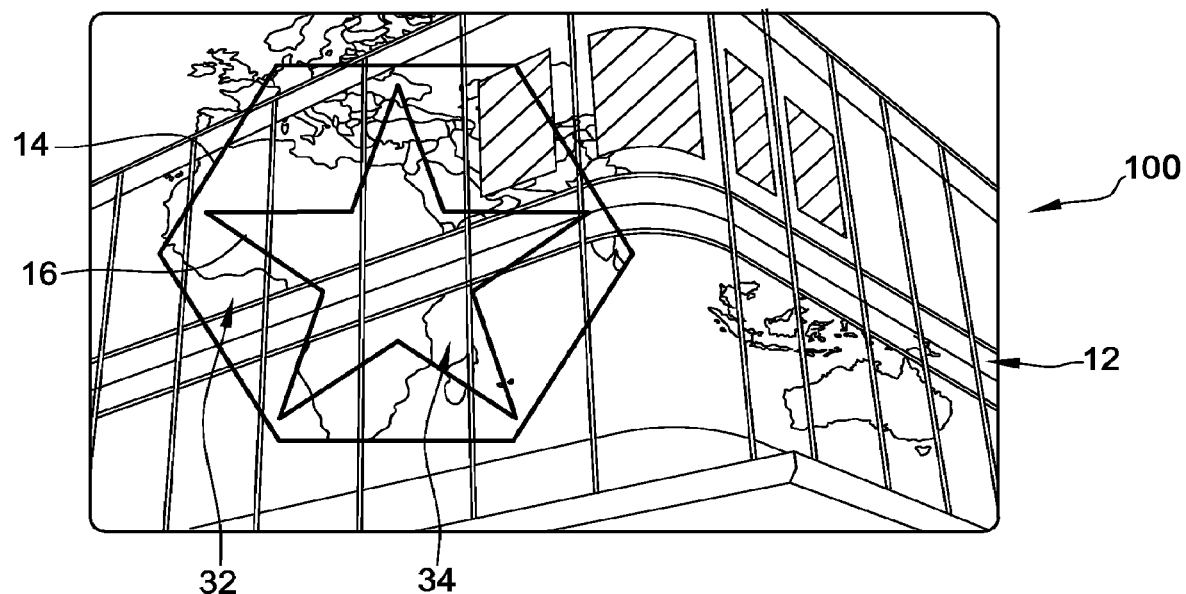
FIG. 3 is a top view of an identification document in accordance with embodiments of the present disclosure according to a second embodiment.

For example, as shown on FIG. 3, which illustrates a different embodiment of the secure multilayer structure 100 according to the present disclosure, the secure multilayer structure 100 comprises two security elements 14 and 16.

Figure 4:
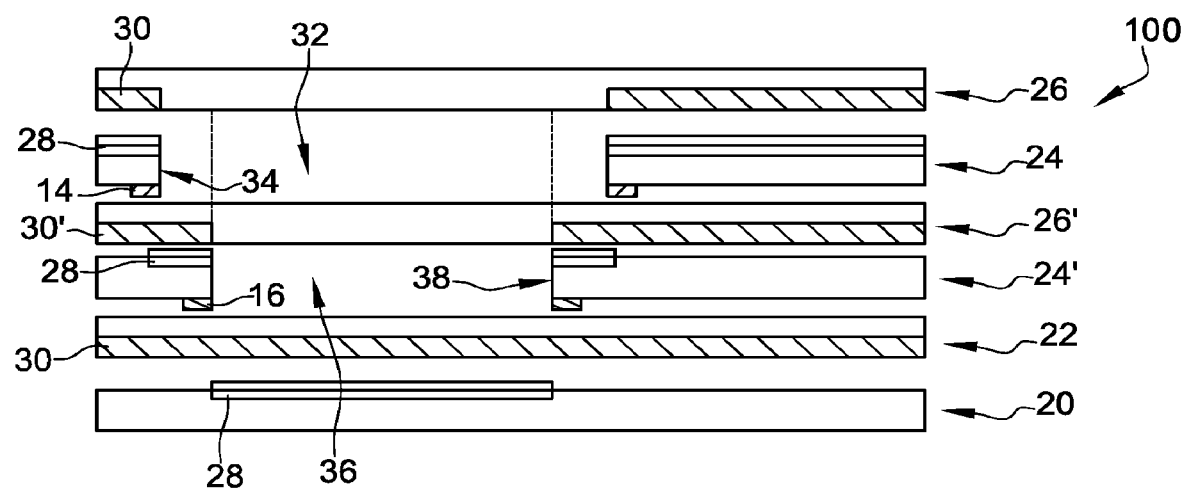
FIG. 4 is a cross-sectional view of the identification document of FIG. 3.

FIG. 4 depicts in further detail the structure of the secure multilayer structure according to the second embodiment, which comprises two masking layers 24, 24' two covering layers 26, 26' and two security elements 14 and 16.

The first masking layer 24 is laminated between the covering layer 26 and a second covering layer 22, while the second masking layer 24' is laminated between the second covering layer 26' and the printed layer 22.

The second masking layer 24' also comprises a second window 36 that is see-through and preferably punched out of the second masking layer 24. Second Window 36 also possesses a closed edge 38. Here the second window 36 has the shape of a five-pointed star, as can be seen on FIG. 1, but is not limited to this shape.

The surface delimited by the edge 38 of the second window 36 is contained within the surface delimited by the edge 34 of the first window 32. In other words, the second window 36 occupies a smaller portion of the total surface of the initial sheet the second masking layer 24' is made of than the first window 32. Thus the second window 36 is contained within the first window 34. Second window 36 is also preferably provided in order to make the laser-engraved region 28 of the base layer 20 visible.

The second security element 16 is positioned between the base layer 20 and the second masking layer 24', adjacent to the second window edge 38. More particularly, the second security element 16 is provided on the side edge of the second masking layer 24' facing printed layer 22.

The second covering layer 26', much like the first, comprises a printed region 30' on one of its sides, preferably the side that is opposite its free surface. The printed region 30' of the second covering layer 26' occupies a portion of the surface of the covering layer 26' that does not face the second window 36. Preferably, the printed region 30' covers the whole surface of the covering layer except the region of the second covering layer 26' facing the second window 36.

Having two security elements 14, 16 confers a greater level of security to the secure multilayer structure 100 as it makes it more difficult to reproduce.

In order to authenticate or verify the authenticity of a multilayer structure 10, 100 according to the present disclosure, a light source providing illumination light is shone towards the security element. The illumination light may correspond to UV light, IR light, white light, ambient light, or combinations thereof. The illumination light is introduced into the security element via the window edge of the multilayer structure 10, 100.

The process continues with the observation of light emanating from the covering layer. It is then determined whether any of the emanating light has a different characteristic or is otherwise visibly different from the illumination light. This determination may help determine whether the illumination light impacted or encountered the security element while it was reflecting within the covering layer. As an example, if the window edge appears to have a rainbow hue or alternating colors that correspond to the alternating colors of the security element(s) 14, 16 then the determination can be made that the multilayer structure 10, 100 is authentic. If, on the other hand, the observed light has not changed relative to the illumination light, then the multilayer structure 10, 100 may be determined to be a counterfeit, forgery, or not authentic.

The invention is not limited to the described embodiments and other embodiments shall clearly appear to the skilled person in the art.

What is claimed is:

1. A secure multilayer structure comprising:
   a base layer;
   a first masking layer comprising a window opened in the first masking layer, said window comprising an edge; and
   a security element including a photoluminescent agent positioned between the base layer and the first masking layer, adjacent to the window edge, the security element configured such that when the window edge is illuminated, the photoluminescent agent re-radiates luminescent light via the window.

2. The secure multilayer structure of claim 1, wherein the photoluminescent agent comprises an ultraviolet fluorescent material.

3. The secure multilayer structure of claim 1, wherein the first masking layer is substantially opaque to the re-radiated luminescent light.

4. The secure multilayer structure of claim 1, comprising a covering layer transmitting at least one of ultraviolet light, visible light, and infrared light.

5. The secure multilayer structure of claim 4, wherein the covering layer comprises a transparent or semi-transparent material.

6. The secure multilayer structure of claim 5, wherein the covering layer comprises at least one of transparent polycarbonate (PC) and thermoplastic polyurethane (PU).

7. The secure multilayer structure of claim 4, wherein at least one of the base layer, the covering layer, and the first masking layer comprises a printed region.

8. The secure multilayer structure according to claim 4, wherein printed regions of at least two of the covering layer, the first masking layer, the base layer, and a printed layer between the base layer and the first masking layer each form at least a part of a single image, such that, when the at least two of the covering layer, the first masking layer, the base layer, and the printed layer are superimposed, said image is formed, and such that when the secure multilayer structure is viewed from above, the image can be viewed in a continuous manner.

9. The secure multilayer of claim 1, comprising a covering layer transmitting at least one of ultraviolet light and infrared light, wherein the covering layer is opaque to visible light.

10. The secure multilayer structure of claim 1, comprising a printed layer between the base layer and the first masking layer, said printed layer comprising a printed region.

11. The secure multilayer structure of claim 1, wherein the base layer comprises at least one of a laser-engraved and printed region facing the window.

12. The secure multilayer structure of claim 1, further comprising:
    a second masking layer, said second masking layer comprising a second window opened in the second masking layer, said second window comprising an edge; and
    a second security element including a photoluminescent agent positioned between the base layer and the second masking layer, adjacent to the second window edge, the second security element configured such that when the second window edge is illuminated, the photoluminescent agent of the second security element re-radiates luminescent light via the second window.

13. The secure multilayer structure of claim 12, wherein a surface delimited by the second window edge is contained within a surface delimited by the window edge of the window in the first masking layer.

14. The secure multilayer structure of claim 12, further comprising a first covering layer and a second covering layer, wherein the first masking layer is laminated between the first covering layer and the second covering layer, and the second masking layer is laminated between the second covering layer and the base layer.

15. The secure multilayer structure of claim 12, wherein the first masking layer masks the security element such that the security element is not visible through the first masking layer and the second masking layer masks the second security element such that the second security element is not visible through the second masking layer.

16. A security document comprising a secure multilayer structure according to claim 1.

17. The secure multilayer structure of claim 1, wherein the first masking layer masks the security element such that the security element is not visible through the first masking layer.

* * * * *